(12) United States Patent
Schaefer

(10) Patent No.: US 7,175,900 B2
(45) Date of Patent: Feb. 13, 2007

(54) REINFORCED PAD AND METHOD OF MAKING

(75) Inventor: John W. Schaefer, Burton, MI (US)

(73) Assignee: Contour Fabricators, Inc., Fenton, MI (US)

( * ) Notice: Subject to any disclaimer, the term of this patent is extended or adjusted under 35 U.S.C. 154(b) by 208 days.

(21) Appl. No.: 10/408,909

(22) Filed: Apr. 8, 2003

(65) Prior Publication Data

US 2003/0211278 A1 Nov. 13, 2003

Related U.S. Application Data

(63) Continuation of application No. 09/628,466, filed on Jul. 31, 2000, now abandoned.

(51) Int. Cl.
  *B32B 3/06* (2006.01)
  *C08F 2/46* (2006.01)
(52) U.S. Cl. ............... 428/76; 428/316.6; 428/318.4; 428/319.3; 428/319.7; 428/131; 427/487; 427/491
(58) Field of Classification Search .............. 428/71, 428/76, 316.6, 308.4, 309.9, 318.4, 319.3
See application file for complete search history.

(56) References Cited

U.S. PATENT DOCUMENTS

| | | |
|---|---|---|
| 3,140,086 A | 7/1964 | Lawson |
| 3,161,436 A | 12/1964 | Hood |
| 3,198,578 A | 8/1965 | Etal |
| 3,264,034 A | 8/1966 | Lawson |
| 3,770,318 A | 11/1973 | Fenton |
| 3,807,800 A | 4/1974 | Morrison et al. |
| 3,833,454 A | 9/1974 | Ambrose |
| 3,840,269 A | 10/1974 | Ambrose |
| 3,845,183 A | 10/1974 | Harrison |
| 4,078,293 A | 3/1978 | Aine |
| 4,632,459 A * | 12/1986 | Herschlag ............... 297/440.1 |
| 4,828,908 A * | 5/1989 | Park et al. ............... 442/9 |
| 5,000,515 A | 3/1991 | Deview |
| 5,177,845 A | 1/1993 | Meiller et al. |
| 5,832,852 A | 11/1998 | Tornero et al. |

* cited by examiner

Primary Examiner—Hai Vo
(74) Attorney, Agent, or Firm—John K. McCulloch

(57) ABSTRACT

A cushioning and positioning pad has a body formed from superposed layers of resiliently compressible foam material and a reinforcing sheet embedded between adjacent layers. The reinforcing sheet is of such stiffness as to resist contraction along its length and width dimensions, but is resiliently bendable in response to the application of a force along its thickness dimension. The reinforcing sheet resists undesirable contraction lengthwise and widthwise of the pad when the latter is encapsulated in a curable coating of material which shrinks as it cures.

18 Claims, 5 Drawing Sheets

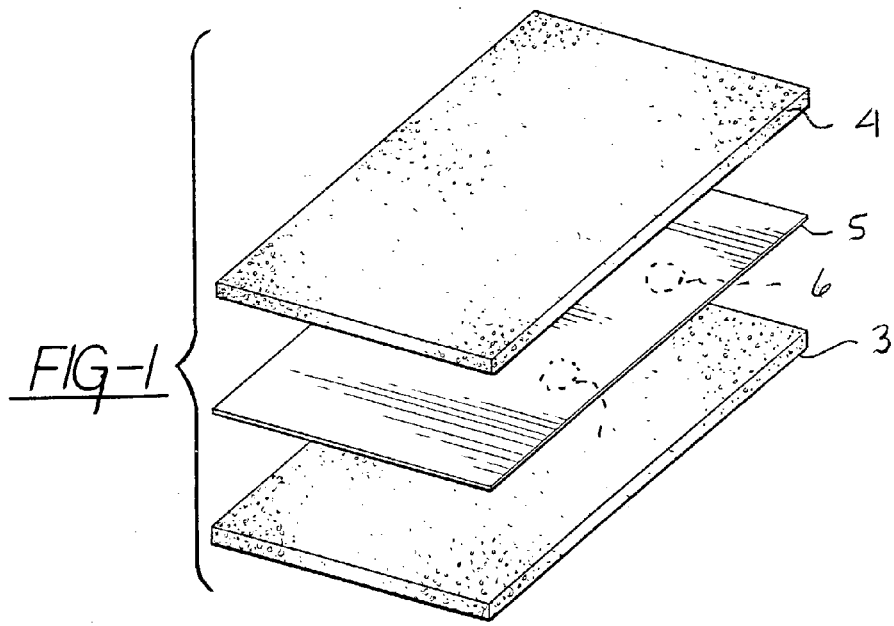
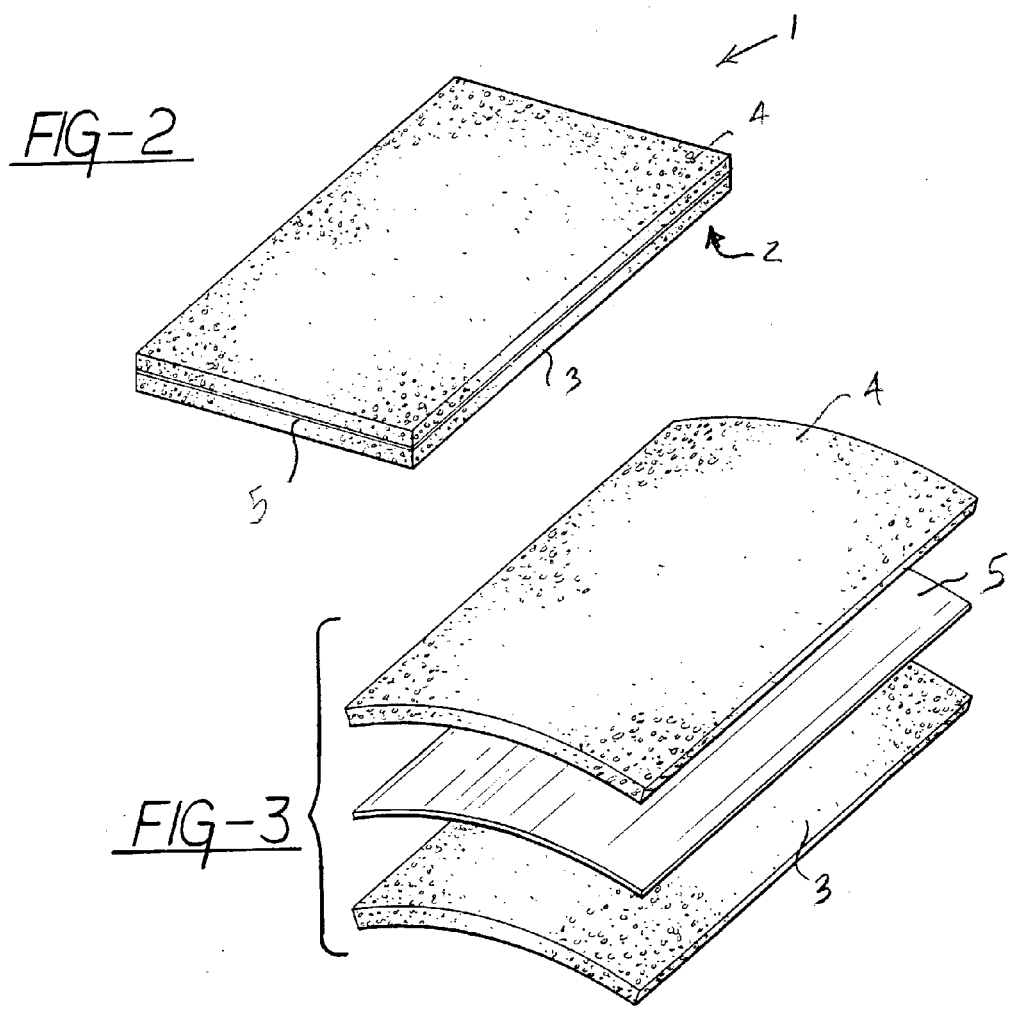

REINFORCED PAD AND METHOD OF MAKING

RELATED APPLICATION

This application is a continuation of application Ser. No. 09/628,466 filed Jul. 31, 2000 now abandoned.

This invention relates to a reinforced cushioning or positioning pad composed of elastomeric polymeric foam material having substantially isotropic properties and a reinforcing insert formed of material having anisotropic properties embedded in the pad.

BACKGROUND OF THE INVENTION

In some instances a cushion or pad is used to provide comfortable support for a person who is undergoing a medical procedure which may include imaging. Such a pad typically is generally planar and made from polymeric foam material of substantially uniform thickness. The length and width of such a pad normally are much greater than its thickness. Such a pad often is provided with an outer, skin-like protective coating formed by the application to the exterior of the pad of one or more coats of liquid paint-like material which then is permitted to dry or cure. Typically, such liquid coatings shrink in response to drying or curing and impose forces on the pad that compress it in all directions. It is the nature of such liquid coatings that, even when applied to a pad with great care, the shrinkage and corresponding compression are variable and unpredictable, thereby resulting in the production of a pad whose dimensions are not acceptable.

Typically, it is required that a cushioning or positioning pad fit a medical table or other patient support on which it is used and within certain dimensional tolerances. This usually means that the length and width of the pad must be controlled closely. It is desirable, therefore, to stabilize these dimensions during fabrication and coating so that variable shrinkage does not result in an unacceptable dimensional change. However, the means by which dimensional stabilization is achieved should not unduly stiffen the pad in the thickness dimension and thereby prevent the pad from providing comfortable support for a person.

In other instances a cushioning or positioning pad is required to support a person in a fixed position, or in an anatomical configuration required for a specific medical procedure. Such a positioning device may have any one of a variety of different shapes as may be required by the procedure in connection with which it is used. The shape of a positioning pad therefore may be geometrically complex. The most commonly used means for shaping such pads includes costly equipment or tooling which causes the cost of such pads to be inordinately expensive if the expense of the required shaping equipment or tooling must be amortized over a small production volume. It is desirable, therefore, to provide relatively inexpensive means of accomplishing the necessary shaping of the pad.

In still other instances it is desirable that a cushioning or positioning pad made of resiliently deformable polymeric foam, which naturally has isotropic mechanical properties, be modified for an application other than those referred to above so that the mechanical properties of such pads are anisotropic for all or a portion thereof. For example, the modified pad might be required to respond to the application of certain mechanical loads or external influences in one manner, and to respond to the application of other loads or influences applied at a different location in another manner.

SUMMARY OF THE INVENTION

A cushioning and positioning pad constructed in accordance with the invention has a body formed of resiliently deformable polymeric foam material of the desired shape and of desired length, width, and thickness dimensions, and a reinforcing sheet embedded in the foam material. The reinforcing sheet has length and width dimensions corresponding substantially to those of the foam, but the thickness of the sheet is less than that of the foam portion of the body. The material from which the sheet is formed has an elastic modulus much greater than that of the polymeric foam material. Such a reinforcing sheet is relatively stiff in tension and compression along its length and width axes, but is flexible and readily deflectable along its thickness axis. The elastic and plastic behaviors of the reinforcing sheet are selected according to the purposes for which the pad is designed.

In those instances in which the pad has an other-than-planar shape or where the required manufacturing volume and complexity are such that fabrication is economically preferable to molding, it may be desirable, for least material costs, least tooling costs, or greatest ease of production, to fabricate the pad in a modified shape deformed toward planarity. This deformation serves to decrease the effective enveloping volume of the pad and minimize material usage and/or tooling volume and complexity, and/or serves to make the required shapes easier to fabricate by means of conversion of complex-curved surfaces into single-curved or planar surfaces. Techniques herein described are then used to cause the pad to attain its desired final shape and properties. The selective combination of the isotropic body properties and anisotropic reinforcing sheet cause the pad to have the desired anisotropic properties.

In one embodiment of a pad that is planar or single-curved and has length and width dimensions significantly greater than its thickness dimension, the foam portion of the pad body is made in halves of the desired length and width and divided on the thickness dimension, or molded into such final shape halves. In either of these two cases a reinforcing sheet then is inserted between and bonded to the two halves by means of an adhesive or other effective means, together with elastic deformation of the body halves and reinforcing sheet as required so that the resulting assembly has the desired final shape, dimensions, and other mechanical properties. Alternatively, the body may be molded around a pre-placed reinforcing sheet. This embodiment can provide the desired property of greater compression and extension stiffness along the length and width axes than along the thickness axis.

In another embodiment a pad that is to have a single-curved final shape, but for economic reasons must be fabricated from least-cost materials, the body halves are fabricated as flat shapes from economical roll-type foam material. The body halves and the reinforcing sheet then may be assembled and bonded in a suitable curved jig or fixture, with each piece suitably elastically deformed to follow the curvature of the fixture and the other pieces with which it is to be combined. The curvatures of the fixture may be different from, and typically smaller-radiused than, those of the desired final shape so that, when the assembled pad is removed from the fixture, it will assume the desired final shape. In this embodiment the inherent restorative elastic force of the individual deformed pieces is less than the overall effective bending stiffness of the bonding assembly, so the desired curved shape is retained. This embodiment can provide the desirable property of greater compressive stiffness along the length and width axes than along the thickness axis, and also allows achievement of a non-polar final shape even though it is made of inexpensive planar materials.

In another embodiment of pad having a curved shape, the foam for the body halves is fabricated to shapes that are related to the required final shape, but are squashed or elastically deformed toward planarity with a lesser effective enveloping volume and thus less material usage. This squashed shape must be one that can be elastically deformed to the desired final shape by means of an appropriate, distributed force. The reinforcing sheet separately is plastically deformed, using known mechanical or thermal means, to achieve an elastically retained shape corresponding to a curved surface that is suitably intermediate between the appropriate surfaces of the required final configuration of the pad. The fabricated body halves then are pressed against the formed reinforcing sheet in such manner that they are deformed to conform to the shape of the sheet by means of extension or compression of the body foam as required on various axes. The fabricated body halves may be adhesively or otherwise bonded to the formed reinforcing sheet, in known manner, in order to retain the desired distortion. This embodiment can provide the desirable properties of having anisotropic mechanical properties in a more three-dimensional shape than the materials from which it is made.

If the pad of the embodiments referred to above is to be coated to provide a protective, washable outer skin, and if the coating material is one which shrinks as it dries or cures, the reinforcing sheet typically is located on the pad's neutral bending axis in such manner as to maintain a balance in the shrink forces generated by the drying or curing of the coating so as to avoid warping due to unbalanced forces.

Alternatively, for each of the preceding embodiments the body may be fabricated or molded to incorporate two or more reinforcing sheets of equal or differing sizes and shapes instead of a single reinforcing sheet. The locations and orientations of these reinforcing sheets are chosen to provide both the desired overall anisotropic mechanical properties, including symmetrical resistance to applied forces about the appropriate neutral bending axis in the case of a coated cushioning pad as previously described, and also whatever local anisotropic mechanical properties are required for particular points or regions of the pad. The multiple reinforcing sheets may be incorporated within the body of the pad with such multiple orientations as to provide a complex combination of anisotropically modified mechanical properties on multiple axes.

THE DRAWINGS

The presently preferred embodiments of the invention are disclosed in the following description and in the accompanying drawings wherein:

FIG. 1 is an exploded isometric view of a pad body formed of two layers of foamed material between which a reinforcing sheet is sandwiched;

FIG. 2 is an isometric view of the component parts shown in FIG. 1 in assembled relation;

FIG. 3 is a view similar to FIG. 1, but illustrating a modified embodiment;

THE PREFERRED EMBODIMENTS

Figure 4:
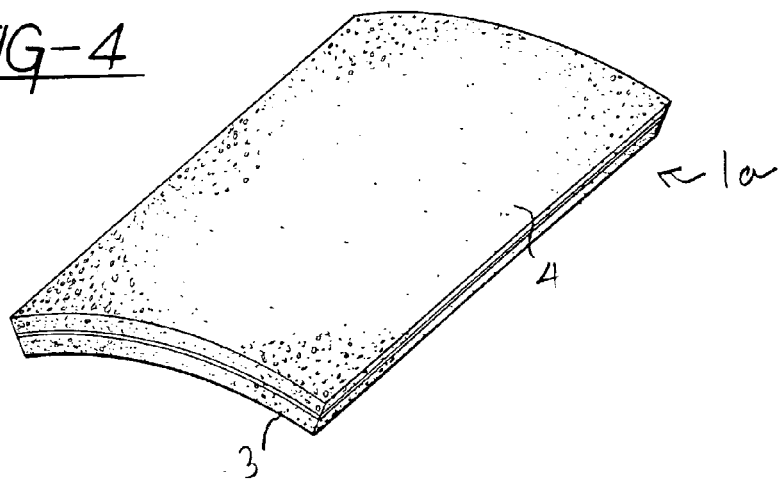
FIG. 4 is an isometric view of the components shown in FIG. 3, but in assembled form.

A cushioning pad constructed in accordance with the embodiment disclosed in FIGS. 1 and 2 is designated generally by the reference character 1 and comprises a composite body 2 formed of two correspondingly shaped foam layers 3 and 4 between which is sandwiched a reinforcing sheet 5 having a configuration, in plan, corresponding to that of the layers 3 and 4, but being substantially thinner than each of the latter.

Each of the layers 3 and 4 has substantially uniform isotropic mechanical properties and may be formed from polymeric foam material such as urethane, olefin, vinyl nitrile, rubber, or other similar material which is readily deformable in its length, width, and thickness axes or dimensions and is elastically recoverable from a deformed condition upon removal of the deforming force. The compressive stiffness and other mechanical properties of the material forming the layers are variable, as is well known, but if the finished pad is to support or position a human, the compressive stiffness should be such as to provide suitably stable, reasonably comfortable support or positioning of such person.

The reinforcing sheet 5 is formed from a material which is of such stiffness as to resist lengthwise and widthwise compression, but which is sufficiently flexible as to be elastically bendable in response to the application of force in the direction of the thickness of the sheet. The sheet may be formed of a suitable inert material, such as MYLAR polyester, and has a length and width corresponding substantially to the length and width of the layers 3 and 4, but the thickness of the sheet 5 is substantially less than that of either of the layers. Typically, a polyester sheet having a thickness of 6 to 20 mils is satisfactory.

The reinforcing sheet 5 may be embedded in the body 2 of the cushioning pad in a number of ways. For example, a foam block may be cut in known manner to form the layers 3 and 4, thereby enabling the sheet 5 to be placed or embedded within the body and positioned so as to span substantially the entire length and width dimensions of a selected portion of the pad. A suitable adhesive of known kind may be used in known manner to secure the sheet immovably within the body 2.

Alternatively, the foam portion of the body 2 may be molded about the body utilizing known molding techniques. In this event the material from which the foam part of the body is formed may be so selected as to adhere in known manner via its inherent properties to the sheet 5, or an adhesive of known kind may be preapplied in known manner to the sheet 5 so as to enhance bonding of the layers to the sheet material during the molding process.

In another alternative the sheet 5 may be provided with a plurality of spaced apart perforations or openings 6 (indicated in dash lines in FIG. 1) and through which some of the adjacent foam material may extend during the molding process, in known manner, to effect an interlock between the reinforcing sheet and the layers 3 and 4.

Following assembly of the foam layers 3 and 4 and the reinforcing sheet 5 to form the body 2, the latter may be coated with one or more layers of a liquid, paint-like material which, when it dries or cures, forms a skin 7 (see FIGS. 12 and 13) which envelopes the body 2 and forms a waterproof, washable outer skin 7 which encapsulates the body. A suitable coating material is one which, as it cures, shrinks and binds the components of the body 2 together, but is sufficiently pliable as to be deformable in response to the application of a deforming force, and recoverable once the force is removed. A suitable coating material is a commercially available vinyl emulsion or solution containing known percentages of polymeric resins, other materials, and water or solvents.

If the foam material from which the layers 3 and 4 are formed is closed cell, no venting of the pad 1 is required. However, if the foam is open cell, the skin 7 should be vented in one or more places, as indicated at 8 in FIG. 12, to enable air to be expelled from and returned to the cells in response to compression and relaxation of the foam.

Figure 5:
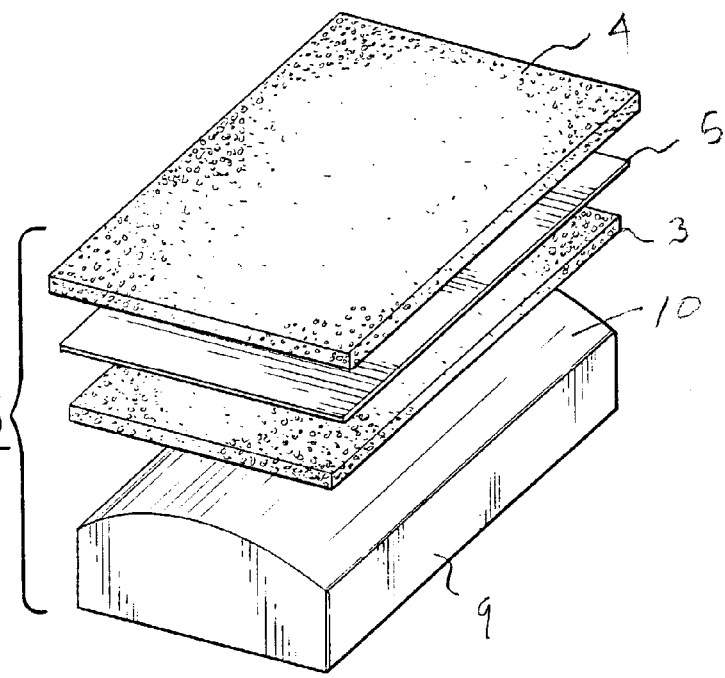
FIG. 5 is an isometric view of unassembled components of another embodiment and a jig or fixture for use in assembling the components.
Figure 6:
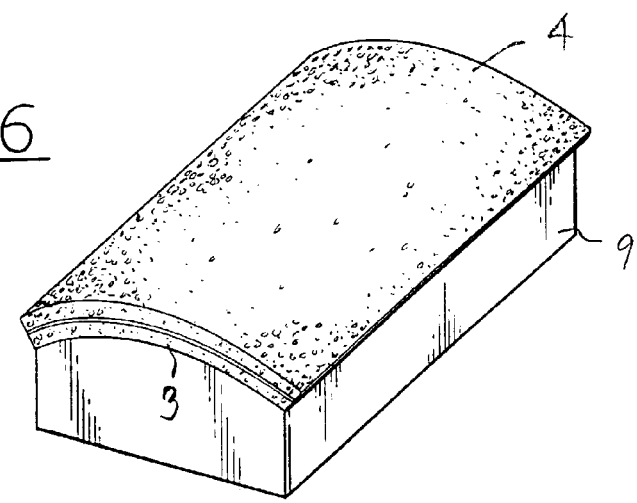
FIG. 6 is an isometric view of the components of FIG. 5 in place on the fixture.
Figure 7:
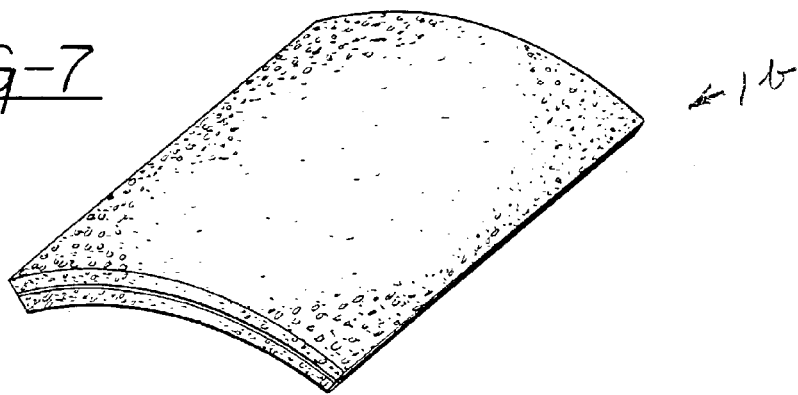
FIG. 7 is an isometric view of a cushion produced from the components shown in FIGS. 5 and 6.

All of the disclosed embodiments are similar in that each comprises a body composed of elastically deformable foam layers between which is sandwiched a stiff, but bendable reinforcing sheet. Accordingly, corresponding reference characters are used in each of the disclosed embodiments to designate corresponding parts. With the exception of the embodiment shown in FIG. 13, the differences between the several disclosed embodiments are in their configuration, rather than in their construction. Thus, in the embodiment of the pad 1a shown in FIGS. 3-7 the component parts are curved from side to side, rather than being planar, and such curvature may be formed from components which initially are curved, as shown in FIGS. 3 and 4, or which may be provided with the curvilinear configuration by being formed on a jig or fixture 9, as shown in FIGS. 5 and 6, having a correspondingly curved surface 10.

Figure 8:
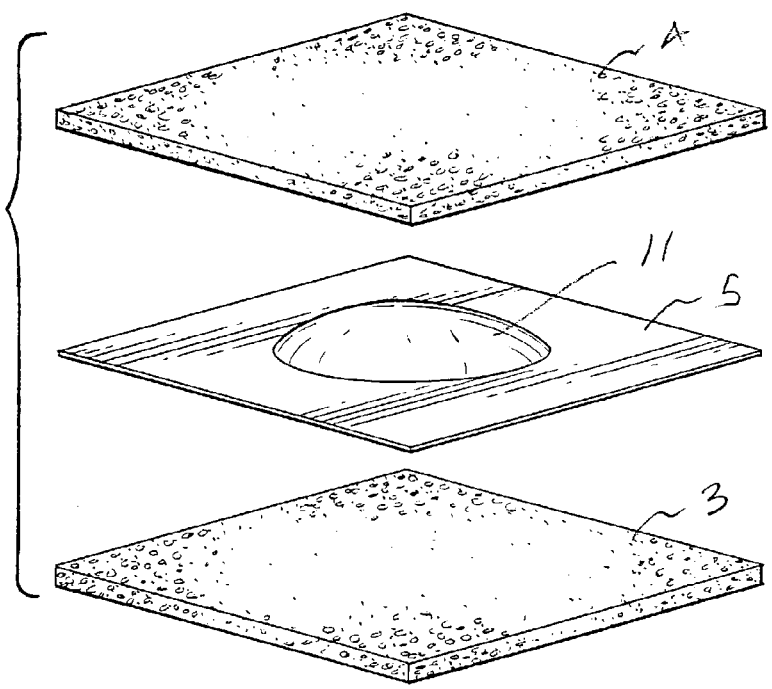
FIG. 8 is an exploded, isometric view of a further embodiment.
Figure 9:
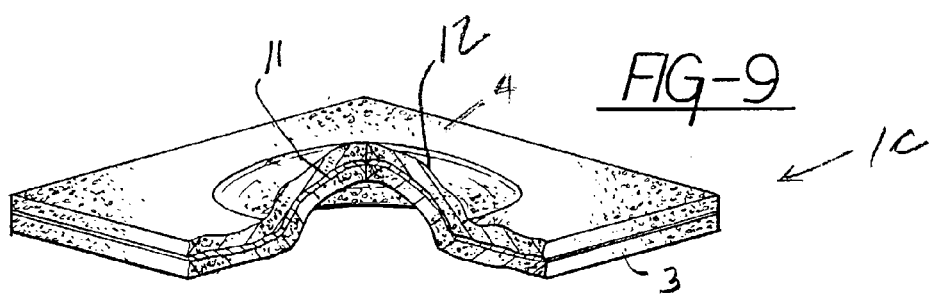
FIG. 9 is an isometric, partly sectional view of a pad formed from the components of FIG. 8.

The pad embodiment 1b shown in FIGS. 8 and 9 has a concavo-convex zone 11 formed in the reinforcing sheet 5 which projects beyond the plane of the sheet 5. The sandwiching foam layers 3 and 4 are deformed and adhered to the reinforcing sheet so as to conform to the configuration of the latter and provide a partly spherical protrusion 12 extending from one surface of the body.

Figure 10:
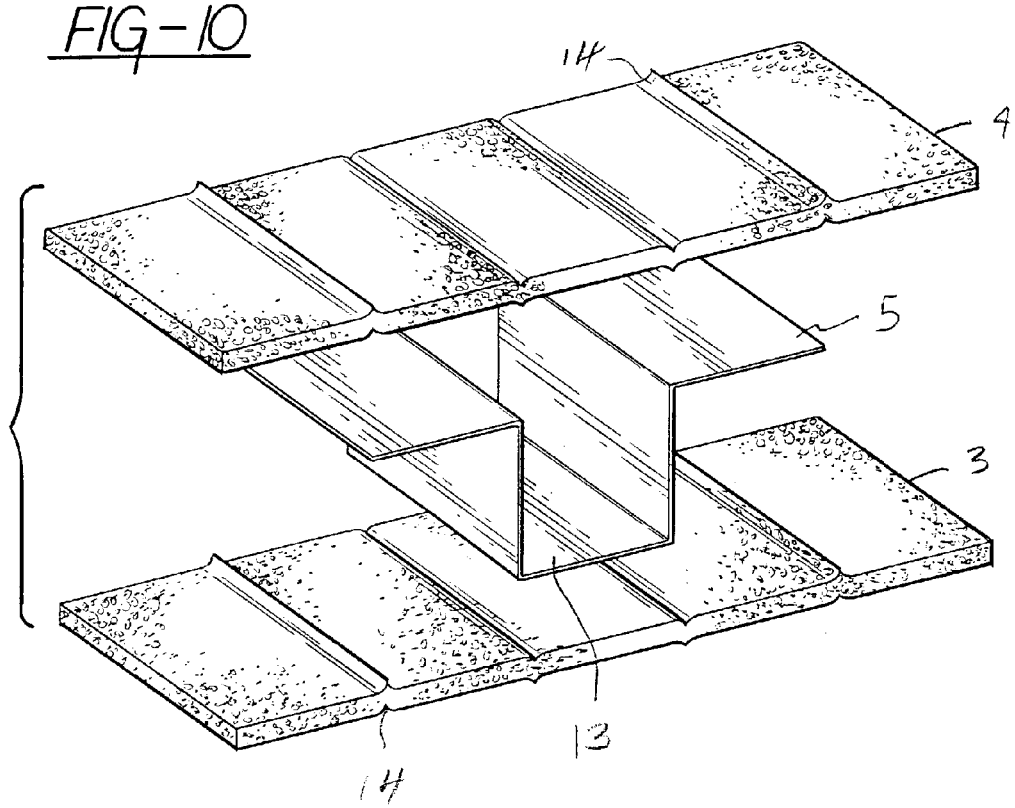
FIG. 10 is an exploded, isometric view of a further embodiment.
Figure 11:
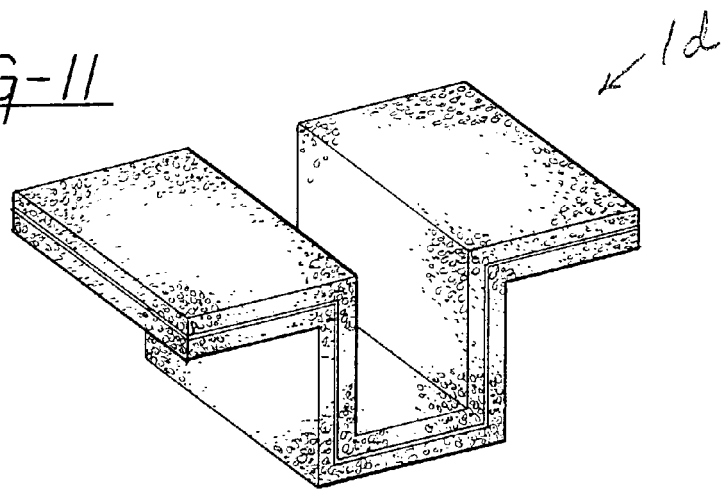
FIG. 11 is an isometric view of a pad formed from the components of FIG. 10.

In the contoured pad embodiment 1c shown in FIGS. 10 and 11 the reinforcing sheet 5 is initially deformed to provide a central trough 13 and the sandwiching foam layers 3 and 4 are molded to provide concavo-convex ribs 14 which facilitate conforming of the foam layers 3 and 4 to the configuration of the reinforcing sheet.

Figure 13:
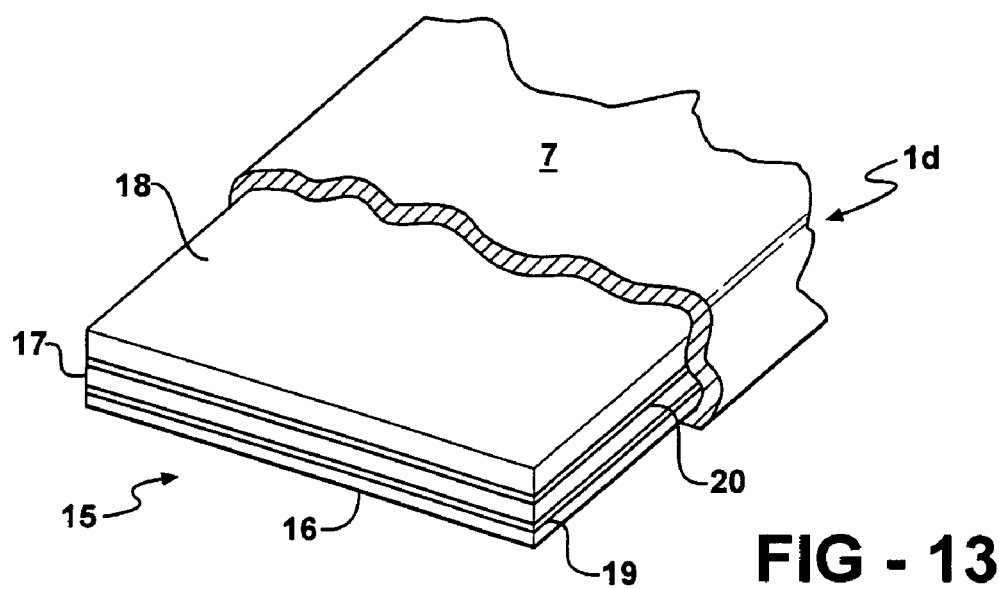
FIG. 13 is a fragmentary view of an encapsulated cushion having more than one reinforcing sheet embedded therein.

The pad embodiment 1d shown in FIG. 13 corresponds to the others with the exception that the pad id has a foam body 15 composed of three layers 16, 17, and 18 of foam material like that described earlier. Between the layers 16 and 17 is embedded a reinforcing sheet 19 and between the layers 17 and 18 is embedded a second reinforcing sheet 20. The sheets 19 and 20 correspond in all respects to the sheet 5.

The principal difference between the embodiment of FIG. 13 and those described earlier, aside from the presence in the latter embodiment of a plurality of reinforcing sheets, is that the sheets 19 and 20 are positioned closer to one surface of the pad than to the opposite surface rather then being positioned at the neutral axis of the pad 1d. However, the sheets are parallel to that axis and to each other, and preferably are equally spaced on opposite sides of such axis.

Figure 12:
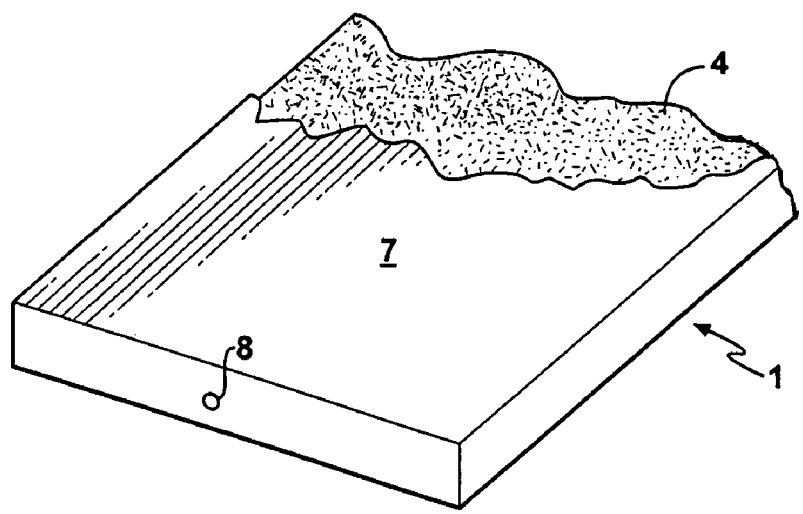
FIG. 12 is a fragmentary, isometric view of a cushion encapsulated in a protective coating.

Although not shown in the drawings for purposes of clarity it will be understood that each of the pad embodiments may include an outer skin or coating like that shown in FIGS. 12 and 13.

The foam material from which the body of the cushioning pad is formed has, as has been stated, substantially isotropic mechanical properties, including elastic compressibility in all planes. For reasons that have been explained hereinbefore, it is preferred to make the mechanical properties of the pad partially anisotropic so as to disable any substantial contraction of the pad lengthwise and widthwise, while retaining the deformability in the direction of the thickness of the pad. This objective is achieved by embedding the reinforcing sheet within the confines of the pad and by constructing the reinforcing sheet of material which is of such stiffness as to resist lengthwise and widthwise contraction, but which is sufficiently flexible as to be elastically bendable in response to the application of force in the direction of the thickness of the sheet.

The length and width dimensions of the reinforcing sheet preferably correspond to those of the foam body portion, thereby enabling the side and end edges of the reinforcing sheet or sheets and the side and end edges of the foam body portion to be substantially flush, as clearly is shown in many of the drawing figures, such as FIGS. 2, 4, 6, 7, 9, 11, and 13.

The disclosed embodiments are representative of presently preferred forms of the invention, but are intended to be illustrative rather than definitive thereof. The invention is defined in the claims.

I claim:

1. A reinforced pad comprising a body having length, width, and thickness dimensions and opposite side and end edges, said body being formed of resiliently compressible material; at least one reinforcing sheet having opposite side and end edges, said sheet having length and width dimensions corresponding substantially to the length and width dimensions of said body and a thickness dimension less than that of said body; and a cured protective cover encapsulating said body and said sheet and being formed from an uncured curable substance which contracts and applies contracting force on said body in response to curing, said sheet being formed of material having a stiffness in the length and width dimensions of said sheet greater than the contracting force applied to said body in response to curing of said curable substance, the opposite side and end edges of said body and the opposite side and end edges of said sheet being flush following curing of said curable substance.

2. The pad according to claim 1 wherein said sheet is deflectable in a direction transversely of its length and width.

3. The pad according to claim 1 wherein said side and end edges of said sheet occupy positions spaced inward of the corresponding edges of said cover following the curing of substance.

4. The pad according to claim 1 wherein said sheet is embedded in said body at a level closer to one surface thereof than to that surface opposite said one surface.

5. The pad according to claim 4 including a second reinforcing sheet corresponding to said one reinforcing sheet and embedded in said body at a level closer to said opposite surface than to said one surface.

6. The pad according to claim 5 wherein said body has a neutral axis and wherein each of said sheets is parallel to said axis and to one another.

7. The pad according to claim 1 wherein said cover is vented.

8. The pad according to claim 1 wherein said body has a neutral axis and wherein said sheet is embedded in said body and occupies a position at said axis.

9. The pad according to claim 1 wherein said body has opposite surfaces which are planar and parallel to one another.

10. The pad according to claim 1 wherein said body has opposite surfaces which are arcuate and parallel to one another.

11. A reinforced pad adapted for use with a support surface having predetermined length and width dimensions to which the length and width dimensions of said pad conform within predetermined tolerances, said pad comprising a body formed of resiliently compressible foam material having length, width, and thickness dimensions and opposite side and end edges, said body having opposite surfaces parallel to one another; at least one reinforcing sheet having opposite side and end edges and length and width dimensions no greater than those of said body, said sheet having a thickness dimension less than that of said body, said sheet being embedded in said body; and a protective cover encapsulating said body and said sheet, said cover having been formed by application to said body of a curable liquid material that contracts and applies a contracting force on said body in response to curing, said sheet being formed from material having a stiffness greater than that of said foam material and greater than the contracting force applied by said liquid material in response to curing thereof, thereby enabling said sheet to disable compressive contraction of said body in the length and width dimensions thereof in response to curing of said liquid material, said opposite side and end edges of said body and said sheet being substantially flush following curing of said liquid material.

12. The pad according to claim 11 wherein said sheet is deflectable in a direction transversely of its length and width dimensions.

13. The pad according to claim 11 wherein said foam material is open cell foam and wherein said cover is vented.

14. A reinforced pad comprising a body of compressible cushioning material; a reinforcing sheet embedded in said body, said sheet and said body having corresponding side and end edges substantially parallel to one another; and a cured protective coating forming a cover encapsulating said body and said sheet, said body having uncontracted length, width, and thickness dimensions, said sheet having length and width dimensions corresponding substantially to the uncontracted length and width dimensions of said body and a thickness dimension less than that of said body, said sheet having a stiffness in its length and width dimensions greater than that of said body, said protective coating having been applied to said body in uncured liquid form and being formed from a curable liquid material that contracts in response to curing, said sheet being of such stiffness and occupying such position within said body as to disable lengthwise and widthwise contraction of said body in response to curing of said curable material and thereby prevent contraction of the side and end edges of said body inwardly of the side and end edges of said sheet, the contracting of said curable material in response to curing effecting the application of contractive force on those portions of said body in said thickness dimension and on opposite sides of said sheet.

15. The pad according to claim 14 wherein said cushioning material has substantially corresponding isotropic deformability properties in the length, width, and thickness dimensions.

16. A method of forming a reinforced pad from a resiliently compressible body having length, width, and thickness dimensions and opposite side and end edges, said method comprising embedding in said body a reinforcing sheet having length and width dimensions corresponding substantially to the length and width dimensions of said body and opposite side and end edges substantially parallel to and substantially flush with the corresponding edges of said body, said reinforcing sheet having a thickness dimension less than that of said body and a stiffness resistant to contraction greater than that of said body; applying in liquid form to said body in its entirety a curable substance which contracts as it cures; and curing said substance to form a protective cover encapsulating said body and said sheet, the stiffness of said sheet disabling contraction of said body in its length and width dimensions inwardly of the end and side edges of said sheet in response to curing of said substance, the embedding of said sheet enabling contraction of those portions of said body on opposite sides of said embedded sheet in response to the curing of said substance.

17. The method according to claim 16 wherein the thickness dimension of said sheet is such as to enable said sheet to flex in response to the application of an external force on said body in the direction of said thickness dimension.

18. The method according to claim 16 including forming at least one vent opening through said cover.

* * * * *